H. & G. A. GRAVES.
DAMPER DEVICE.
APPLICATION FILED MAR. 17, 1910.
974,876.
Patented Nov. 8, 1910.
2 SHEETS—SHEET 1.
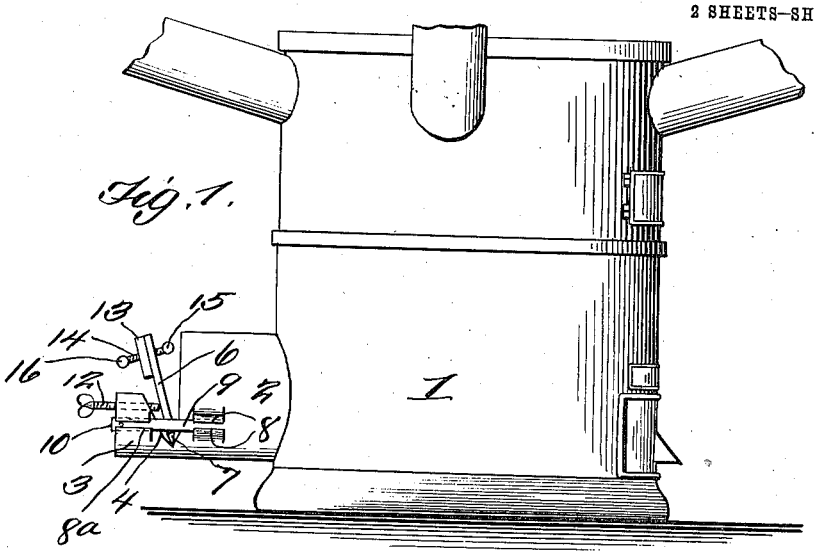
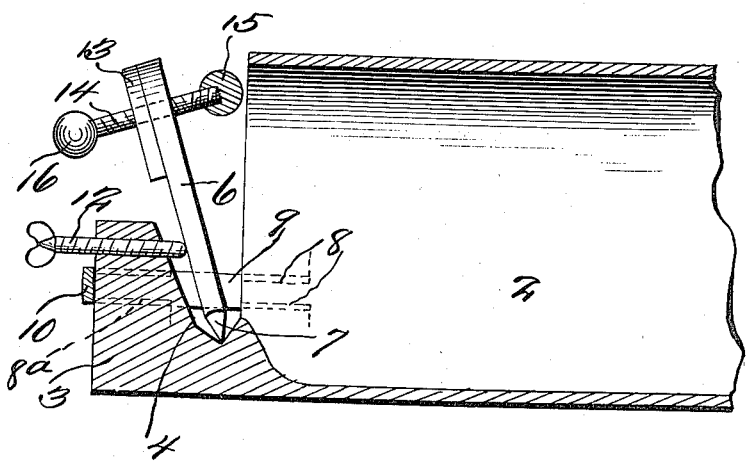
Witnesses
Francis G. Boswell
Mark L. Grange
Inventors
Herbert Graves
Geo. A. Graves
By D. Swift & C.
Attorneys H. & G. A. GRAVES.
DAMPER DEVICE.
APPLICATION FILED MAR. 17, 1910.
974,876.
Patented Nov. 8, 1910.
2 SHEETS—SHEET 2.
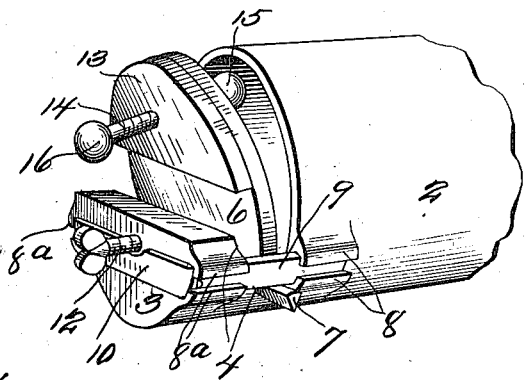
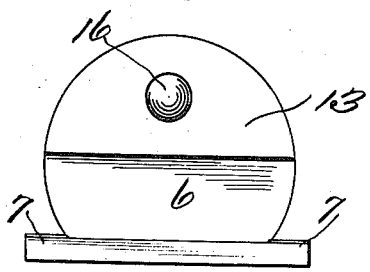
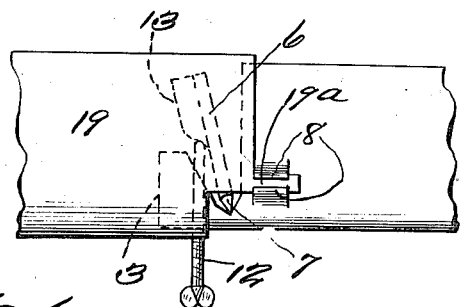
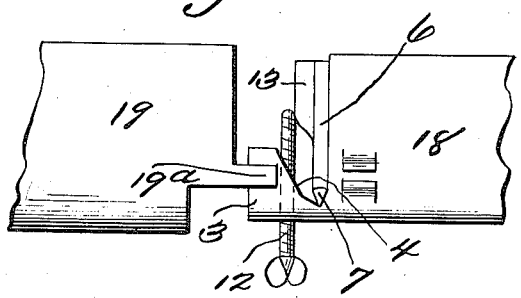
Witnesses
Francis G. Boswell.
M. DeGrange
Inventors
Herbert Graves
Geo. A. Graves
By D. Swift
Attorneys

UNITED STATES PATENT OFFICE.

HERBERT GRAVES AND GEORGE A. GRAVES, OF SPRINGBROOK, OREGON.

DAMPER DEVICE.

974,876.  Specification of Letters Patent.  Patented Nov. 8, 1910.

Application filed March 17, 1910. Serial No. 549,940.

*To all whom it may concern:*

Be it known that we, HERBERT GRAVES and GEORGE A. GRAVES, citizens of the United States, residing at Springbrook, in the county of Yamhill and State of Oregon, have invented a new and useful Damper Device; and we do hereby declare the following to be a full, clear, and exact description of the invention, such as will enable others skilled in the art to which it appertains to make and use the same.

This invention pertains to a new and novel damper adapted mainly for use upon stoves, furnaces and similar apparatus, whereby the draft may be automatically controlled, and also to regulate the amount of draft through the stove, or furnace or pipe.

The basic object of the invention is to provide a hinged plate or damper supported by a segmental hood. This hood is transversely recessed, in order to receive the lower portion of the plate or damper, said recess being of sufficient width at its upper portion, so as to limit the outward movement of the plate or damper, and having suitable retaining members upon each side of the pipe to which the damper is applied, and received by guide-ways, in order to hold the damper or plate in place.

A further object is the provision of an enlargement, carried by the upper portion of the plate or damper, so that when the draft decreases in capacity, the tendency of the plate or damper is to open by the additional weight of this enlargement. Penetrating the enlargement and the plate is a threaded screw, on one end of which a handle is formed, while the other end is provided with a ball or enlarged head portion. Adjusting this screw inwardly or outwardly, it is evident that an increased or decreased capacity of draft will be necessary to open or close the damper or plate. For instance, that if the screw is adjusted considerably inwardly, the plate or damper would only necessitate a small amount of draft to close it, but if the screw is adjusted to its fullest extent at the opposite or outward direction, an increased amount of draft would have to be exerted to close the damper. This damper may be easily applied to the ordinary pipe or flue, as shown clearly in the drawings.

The drawings disclose a specific form of damper device, but the applicants in no way hold themselves to this particular form. The right is reserved to make changes or alterations, if such become necessary, during an actual reduction to practice, provided such changes or alterations fall within the scope of the appended claims.

Further objects and combination of various parts will be hereinafter more fully described and pointed out in the appended claims.

Figure 1 is a side elevation of a furnace or stove, showing the invention applied thereto. Fig. 2 is a sectional view on an enlarged scale, showing the detail structure. Fig. 3 is a detail perspective view of a portion of the outwardly projecting pipe of the furnace, showing its hood portion, which supports the damper, showing one of the plates ready to be received by its guideways, in order to hold the damper from displacement. Fig. 4 is a detail perspective view of the damper. Fig. 5 is an elevation of a two-part pipe or flue, showing the damper as applied thereto. Fig. 6 is a detail view, showing the two sections of the flue as shown in Fig. 5 partly separated, in order to show how the parts may be assembled.

In the drawings, a side elevation of a furnace (which is designated by the character 1) is shown as provided with a short projecting pipe or flue 2, the outer portion of which is formed with a segmental hood 3. This hood is transversely recessed at points designated by the character 4. These recesses are V-shaped in side view, and the lower portions, or their apex, receive the lower portion of a plate or damper 6, in order to allow the same to have a pivotal action. The damper or plate 6 has lateral projecting lugs 7.

The sides of the short flue or pipe 2, near its lower portion, are provided with guideways 8, in which plates 9 are received. These plates 9 are positioned immediately above the lateral projecting lugs of the plate or damper, in order to retain the plate or damper in its place. In Figs. 1, 2, and 3 these plates are shown as being connected by a transverse portion 10, which approximately forms a U or staple shaped member.

Penetrating the hood is a threaded screw 12, which may be adjusted inwardly or outwardly; if adjusted inwardly, the plate or damper will have less play, than if adjusted considerably outwardly. The upper portion of the plate or damper is provided with an enlargement 13, and extending through the enlargement and the plate is a screw 14, provided at one end with a knob 16, and at its other end with a ball or headed portion 15. If the draft through the short pipe or flue 2 and through the stove is of increased capacity, it is necessary to adjust the screw 14 considerably outwardly, but when the draft decreases, it is necessary to adjust the screw in the opposite direction. It is evident that the two screws, for example the screw 14 and the screw which penetrates the hood, may be readily adjusted, or regulated in accordance with the draft, and furthermore to insure the proper control of the draft.

The above set forth detail structure of damper may be applied to the ordinary flue or pipe, for instance, as shown in Figs. 5 and 6, but with slight changes; for an illustration, as shown in Figs. 5 and 6, the pipe or flue 18 is shown as being constructed of two parts, one part being similar to that shown in Figs. 1, 2, 3 and 4, while the other part 19, is so formed as to fit the hood portion, and engage the other part, the damper being supported similar to that shown in Figs. 1, 2, 3 and 4. It is believed that one may ascertain the complete operation and detail structure, from the foregoing descriptions, when taken in connection with the annexed illustrations. The part 19 of the flue shown in Fig. 5 is provided with lugs 19ᵃ, which perform the same functions as the plates 9, and are received between the lugs 8, shown in Fig. 5. The under portion of the part 19 of the flue is cut away to contact with the upper portions or faces of the projecting lugs 7, in order to retain the damper 6 in position.

The invention having been fully set forth, what is claimed as new and useful is:—

1. In a damper device, a furnace projecting pipe or flue having a hood, said hood having V-shaped recesses, a damper having lateral projecting lugs mounted in said recesses, said pipe or flue having guide-ways upon either side, plates received by said guide-ways immediately above said lugs, in order to hold the plate or damper securely in position.

2. In a damper device, a furnace projecting pipe or flue having a hood, said hood having V-shaped recesses, a damper having lateral projecting lugs mounted in said recesses, said pipe or flue having guide-ways upon either side, plates received by said guide-ways immediately above said lugs, in order to hold the plate or damper securely in position, and an adjusting screw penetrating said hood to be contacted with by the damper, in order to limit its play.

3. In a damper device, a furnace projecting pipe or flue having a hood, said hood having V-shaped recesses, a damper having lateral projecting lugs mounted in said recesses, said pipe or flue having guide-ways upon either side, plates received by said guide-ways immediately above said lugs, in order to hold the plate or damper securely in position, and means carried by the damper adapted to be adjusted in order to necessitate an increased or decreased amount of draft to operate the damper.

4. In a damper device, a furnace projecting pipe or flue having a hood, said hood having V-shaped recesses, a damper having lateral projecting lugs mounted in said recesses, said pipe or flue having guide-ways upon either side, plates received by said guide-ways immediately above said lugs, in order to hold the plate or damper securely in position, and an adjusting screw penetrating said hood to be contacted with by the damper, in order to limit its play, said damper having a weighted portion, and provided with means penetrating the weighted portion and the damper adapted to be adjusted, in order to necessitate increased or decreased amount of draft to operate the damper.

In testimony whereof we have signed our names to this specification in the presence of two subscribing witnesses.

HERBERT GRAVES.
GEORGE A. GRAVES.

Witnesses:
A. P. OLIVER,
ALBERT BENSON.